United States Patent [19]

Mueller et al.

[11] Patent Number: 5,106,516

[45] Date of Patent: Apr. 21, 1992

[54] MONOCARBOXYLIC ACID METHYLESTERS IN INVERT DRILLING MUDS

[75] Inventors: Heinz Mueller, Monheim; Claus-Peter Herold, Mettmann; Stephan von Tapavicza, Erkrath, all of Fed. Rep. of Germany

[73] Assignee: Henkel Kommanditgesellschaft auf Aktien, Duesseldorf-Holthausen, Fed. Rep. of Germany

[21] Appl. No.: 478,189

[22] Filed: Feb. 9, 1990

[30] Foreign Application Priority Data

Feb. 9, 1989 [DE] Fed. Rep. of Germany ....... 3903784

[51] Int. Cl.$^5$ .............................................. C09K 7/06
[52] U.S. Cl. .................... 507/138; 507/129; 507/130
[58] Field of Search ........................... 252/8.511, 8.515

[56] References Cited

U.S. PATENT DOCUMENTS

| | | |
|---|---|---|
| 2,816,073 | 12/1957 | Stratton ................... 252/8.5 |
| 3,047,493 | 7/1962 | Rosenberg ............... 252/8.5 |
| 3,310,125 | 3/1967 | Darley .................... 175/66 |
| 3,761,410 | 9/1973 | Mondshine et al. .......... 252/8.5 |
| 4,356,096 | 10/1982 | Cowan et al. ............ 252/8.5 |
| 4,362,635 | 12/1982 | Dhein .................... 252/56 S |
| 4,374,737 | 2/1983 | Larson et al. ............. 252/8.5 P |
| 4,409,108 | 10/1983 | Carney et al. ........... 252/8.5 |
| 4,436,636 | 12/1981 | Carnicom ............... 252/8.5 P |
| 4,481,121 | 11/1984 | Barthel .................. 252/8.5 M |
| 4,517,100 | 5/1985 | Nance et al. ............ 252/8.5 |
| 4,631,136 | 12/1986 | Jones ................... 252/8.5 M |
| 4,804,793 | 2/1989 | Lai et al. ................ 252/8.514 |

FOREIGN PATENT DOCUMENTS 229912 7/1987 European Pat. Off. .
768119 2/1957 United Kingdom .
2158437 11/1985 United Kingdom .

OTHER PUBLICATIONS

New Base Oil Used in Low-Toxicity Oil Muds, 1/85, Soc. of Pet. Eng., pp. 137-142.
New Drilling Fluid Technology-Mineral Oil Mud, 6/84, Soc. of Pet. Eng. pp. 975-981.

Primary Examiner—John S. Maples
Assistant Examiner—Gary L. Geist
Attorney, Agent, or Firm—Ernest G. Szoke; Wayne C. Jaeschke; Real J. Grandmaison

[57] ABSTRACT

The invention relates to the use of methylesters of $C_{6-24}$ monocarboxylic acids as the oil phase or as part of the oil phase of invert drilling muds which are suitable for the environment-friendly development of oil and gas sources and which, in a continuous oil phase, contain a disperse aqueous phase together with emulsifirs, weighting agents, fluid loss additives and, if desired, other standard additives. In another embodiment, the invention relates to invert drilling muds which are particularly suitable for the environment-friendly development of oil and gas sources and which are characterized in that the oil phase contains methylesters of $C_{6-24}$ monocarboxylic acids, if desired in admixture with other oil components from the class of non-polluting oils.

18 Claims, No Drawings

MONOCARBOXYLIC ACID METHYLESTERS IN INVERT DRILLING MUDS

BACKGROUND OF THE INVENTION

1. Field of the Invention

This invention relates to new drilling fluids based on ester oils and to invert drilling muds based thereon which combine high ecological compatibility with good stability and performance properties. One important application for the new drilling fluids is in offshore drilling for the development of oil or gas sources, the particular object of the invention in this regard being to provide technically useful drilling fluids of high ecological compatibility. The use of the new drilling fluids is of particular importance in, but is not limited to, the offshore sector. The new drilling fluids may also be used quite generally for land-supported drilling, including for example geothermal drilling, water drilling, geoscientific drilling and mine drilling. In this case, too, the ester-based drilling fluids selected in accordance with the invention basically simplify ecotoxic problems to a considerable extent.

2. Discussion of Related Art

It is known that liquid drilling fluids for sinking bores in rock and bringing up the rock cuttings are slightly thickened, water-based or oil-based fluid systems. Oil-based systems are being increasingly used in practice, particularly in offshore drilling or in the penetration of water-sensitive layers.

Oil-based drilling fluids are generally used in the form of so-called invert emulsion muds which consist of a three-phase system, namely: oil, water and finely divided solids. The emulsions in question are of the water-in-oil (w/o) emulsion type, i.e. the aqueous phase is present in the continuous oil phase in heterogeneous fine dispersion. There are a whole range of additives, including in particular emulsifiers and emulsifier systems, weighting agents, fluid loss additives, alkali reserves, viscosity regulators and the like, for stabilizing the system as a whole and for establishing the desired performance properties. Full particulars can be found, for example, in the Article by P. A Boyd et al entitled "New Base Oil Used in Low-Toxicity Oil Muds" in Journal of Petroleum Technology, 1985, 137 to 142 and in the Article by R. B. Bennet entitled "New Drilling Fluid Technology—Mineral Oil Mud" in Journal of Petroleum Technology, 1984, 975 to 981 and the literature cited therein.

Oil-based drilling muds were originally made from diesel oil fractions containing aromatic constituents. For the purposes of detoxification and reducing the ecological problems thus created, it was then proposed to use hydrocarbon fractions substantially free from aromatic compounds, now also known as "nonpolluting oils", as the continuous oil phase, cf. the literature cited above. Although certain advances were achieved in this way through elimination of the aromatic compounds, a further reduction in the environmental problems caused by drilling fluids of the type herein seems to be urgently required. This applies in particular to the sinking of offshore wells for the development of oil and gas sources because the marine ecosystem is particularly sensitive to the introduction of toxic and non-readily degradable substances.

The relevant technology has for some time recognized the significance of ester-based oil phases for solving these problems. Thus, U.S. Pat. Nos. 4,374,737 and 4,481,121 describe oil-based drilling muds in which nonpolluting oils are said to be used. Non-aromatic mineral oil fractions and vegetable oils of the peanut oil, soybean oil, linseed oil, corn oil and rice oil type, and even oils of animal origin, such as whale oil, are mentioned alongside one another as nonpolluting oils of equivalent rank. The ester oils of vegetable and animal origin mentioned here are all triglycerides of natural fatty acids which are known to be environmentally safe and which, ecologically, are distinctly superior to hydrocarbon fractions, even where they have been de-aromaticized.

Interestingly, however, not one of the Examples in the U.S. patents cited above mentions the use of such natural ester oils in invert drilling muds of the type herein. Mineral oil fractions are used throughout as the continuous oil phase.

The investigations on which the present invention is based have shown that the use of readily degradable oils of vegetable or animal origin, which was considered in the prior art, is not feasible for practical reasons. The rheological properties of such oil phases cannot be controlled for the wide temperature range required in practice of 0° to 5° C. on the one hand, up to 250° C. and higher on the other hand.

Ester oils of the type in question here do not in fact show the same in-use behavior as the pure hydrocarbon-based mineral oil fractions used hitherto. In practice, ester oils irrespective of their constitution undergo partial hydrolysis precisely in the w/o invert drilling muds, resulting in the formation of free carboxylic acids. These free carboxylic acids in turn react with the alkaline constituents always present in the drilling mud systems of the type in question here, for example with the alkali reserve used for corrosion prevention, to form the corresponding salts. However, salts of highly hydrophilic bases and the acids having carbon chain lengths of about C12 to C24 predominantly encountered in oils of natural origin are known to be compounds having comparatively high HLB values which, in particular, lead to the formation and stabilization of o/w emulsions. Use is made of this on a very wide scale in the field of detergents and cleaning preparations. However, the formation of even limited quantities of such o/w emulsifier systems must interfere with the w/o emulsions required for solving the problem addressed by the invention and, hence, must lead to problems.

Earlier applications U.S. Ser. No. 07/452,457 filed Dec. 18, 1989 titled "The use of selected ester oils in drilling muds (I)" and U.S. Ser. No. 07/452,988 filed Dec. 19, 1989 titled "The use of selected ester oils in drilling muds (II)") relate to the use of ester oils based on selected monocarboxylic acids or monocarboxylic acid mixtures and monofunctional alcohols containing at least 2 and preferably at least 4 carbon atoms. The earlier applications show that it is possible with the disclosed esters or ester mixtures of monofunctional reactants not only to establish satisfactory rheological properties in the fresh drilling mud, but also to work with selected known alkali reserves in the drilling mud and thus to prevent unwanted corrosion. The alkali reserve is formed by the addition of lime (calcium hydroxide) or by the presence of zinc oxide or comparable zinc compounds. However, an additional limitation is appropriate in this regard. If unwanted thickening of the oil-based invert drilling mud is to be prevented in practice, the quantity of alkalizing additive and, in particular, the quantity of lime have to be limited. According to the disclosure of the earlier applications mentioned, the maximum addition envisaged is put at about 2 lb/bbl (barrel) oil mud.

In these earlier applications, the alcohol component used in the ester oil is consciously limited to at least 2 and preferably to at least 4 carbon atoms. The reason for this is the fact well known among experts in the field in question that, in the presence of water, the methylesters of carboxylic acids are hydrolyzed particularly easily with formation of the free carboxylic acids. With higher alcohol components, this tendency towards hydrolysis is weakened. The use of monocarboxylic acid methylesters in invert drilling muds of the w/o emulsion type appeared pointless. Their pronounced tendency towards hydrolysis and the resulting premature formation of relatively large quantities of the free carboxylic acids or the salts with o/w emulsifier properties formed therefrom had been expected to result in lasting damage to the system as a whole.

DESCRIPTION OF THE INVENTION

Other than in the operating examples, or where otherwise indicated, all numbers expressing quantities of ingredients or reaction conditions used herein are to be understood as modified in all instances by the term "about".

The teaching of the present invention is based on the surprising observation that the opposite is the case. Methylesters of monocarboxylic acids are particularly valuable ester oil components in w/o invert drilling muds, even when considerable quantities of conventional basic materials are present as alkali reserve in the drilling mud. Thus, in invert drilling muds based on ester oils as the continuous oil phase, larger quantities of lime may be used as additive than described in the earlier applications cited above without the mud undergoing unwanted premature thickening. The methylesters of the C range in question which is described in detail hereinafter may form the ester oil phase as a whole, although it has additionally been found that even the use of limited quantities of methylesters in the continuous oil phase leads to substantial improvements in the rheology of the drilling mud, in its aging behavior and in its sensitivity to the use of alkali reserves for protection against unwanted corrosion.

In a first embodiment, therefore, the present invention relates to the use of the methylesters of $C_{6-24}$ monocarboxylic acids as the oil phase or as part of the oil phase of invert drilling muds which are suitable for the environment-friendly development of, for example, oil and gas sources and which, in a continuous oil phase, contain a disperse aqueous phase together with emulsifiers, weighting agents, fluid loss additives and, if desired, other standard additives.

In another embodiment, the invention relates to w/o invert drilling muds which are suitable for the offshore development of oil and gas sources and which, in a continuous oil phase, contain a disperse aqueous phase together with emulsifiers, weighting agents, fluid loss additives and, if desired, other standard additives, this embodiment of the invention being characterized in that the oil phase contains methylesters of $C_{6-24}$ monocarboxylic acids, if desired in admixture with other oil components from the class of so-called nonpolluting oils.

It is preferred to use monocarboxylic acid methylesters or mixtures of such methylesters which are flowable and pumpable at room temperature and, in particular, even at temperatures in the range from 0° to 5° C. The methylester-containing oil phase of the invert drilling muds best has a Brookfield (RVT) viscosity at 0° to 5° C. of no more than 50 mPa.s, preferably no more than 40 mPa.s and, more preferably, at most about 30 mPa.s. These values for preferred invert drilling muds according to the invention apply both to mixtures containing methylesters or methylester mixtures as the sole constituent of the continuous oil phase and also to materials in which the methylesters make up only one mixture constituent of the oil phase.

The monocarboxylic acid methylesters or oil mixtures containing such components used in the drilling mud preferably have solidification values (pour point and setting point) below 0° C., preferably below −5° C. and more preferably below −10° C. At the same time, the flash point of the methylester-containing oil phase is preferably at or above about 70° C. and preferably at at least about 90° C. Flash points above 100° C. and, in particular, above 150° C. can be particularly suitable.

Where the methylesters used in accordance with the invention only form one mixture constituent in the continuous oil phase of the invert drilling muds, virtually any oil components already known or already described in the field in question may be used as further oil components. The methylesters used in accordance with the invention are generally homogeneously miscible with such components in any mixing ratios.

Possible mixture constituents are, in particular, mineral oils and mineral oil fractions which are included among the so-called nonpolluting drilling oils and which are described in the literature cited at the beginning. The mineral oils and mineral oil fractions in question are generally saturated aliphatic or cycloaliphatic hydrocarbons of comparatively low toxicity. However, particularly important mixture components for admixture with methylesters of the type herein are carboxylic acid ester oils of other alcohols, particular significance being attributed to the corresponding esters of monofunctional alcohols.

The Preferred Methyl Esters

Preferred methylesters are derived from $C_{8-24}$ monocarboxylic acids. The methylesters of higher carboxylic acids in this range, namely those of monocarboxylic acids containing 16 and more carbon atoms, are best at least partly olefinically unsaturated. The lower C chain length range may include olefinically unsaturated carboxylic acid residues. Normally, however, the methylester is at least predominantly derived from saturated monocarboxylic acids.

One important embodiment of the invention is characterized by the use of methylesters of carboxylic acids which may be exclusively or at least predominantly assigned to the $C_{16-24}$ range. The carboxylic acids may be derived from unbranched or branched hydrocarbon chains, particular significance being attributed to the linear chains. Monocarboxylic acids of this type and of the $C_{16-24}$ range in question and methylesters thereof are unsuitable as predominantly saturated hydrocarbon compounds on account of their comparatively high solidification values. Even then, however, esters of the type herein are flowable and pumpable at temperatures of down to 0° to 5° C. providing an adequate level of olefinically unsaturated ester constituents is guaranteed.

Accordingly, the preferred embodiment of the invention is characterized by the use of methylesters of the type described here of which more than 70% by weight and preferably more than 80% by weight are derived from olefinically unsaturated $C_{16-24}$ carboxylic acids. Important natural starting materials are provided by carboxylic acid mixtures containing at least 90% by weight olefinically unsaturated carboxylic acids within the C range in question here. The unsaturated carboxylic acids may be mono- or polyolefinically unsaturated. Where carboxylic acids or carboxylic acid mixtures of natural origin are used, a certain significance is assumed in particular by the double ethylenic bond and, to a lesser extent, also by a triple ethylenic double bond per carboxylic acid molecule in addition to a single ethylenic double bond in the molecule. Among the unsaturated methylesters described herein, there are two sub-classes of particular importance.

The first of these sub-classes is based on unsaturated $C_{16-24}$ monocarboxylic acids of which no more than about 35% by weight are diolefinically and, optionally, polyolefinically unsaturated. In their case, therefore, the content of polyunsaturated carboxylic acid residues in the ester oil is comparatively limited. Within this sub-class, however, it is preferred that at least about 60% by weight of the carboxylic acid residues are monoolefinically unsaturated.

In contrast to the first sub-class described above, the second sub-class of ester oils of practical significance is derived from $C_{16-24}$ monocarboxylic acid mixtures of which more than 45% by weight and preferably more than 55% by weight are derived from diolefinically and/or polyolefinically unsaturated acids within the C range mentioned.

The most important monoethylenically unsaturated carboxylic acids within the range in question here are hexadecenoic acid ($C_{16}$), oleic acid ($C_{18}$), the related ricinoleic acid ($C_{18}$) and erucic acid ($C_{22}$). The most important diunsaturated carboxylic acid within the range in question here is linoleic acid ($C_{18}$) while the most important triethylenically unsaturated carboxylic acid is linolenic acid ($C_{18}$).

According to the invention, selected individuals of this ester type may be used as the methylester component. One example of such an ester is the methylester of oleic acid. However, so far as the rheology of the system is concerned or for reasons of availability, it is generally best to use acid mixtures. This is essential for the definition of the two above-mentioned sub-classes of preferred methylester oils.

The first of these two sub-classes is distinguished by the fact that its content of di- and polyolefinically unsaturated acids is limited and does not exceed about 35% by weight. Vegetable oils of natural origin, of which the hydrolysis or transesterification with methanol gives mixtures of carboxylic acids or methylesters of the type required herein, are, for example, palm oil, peanut oil, castor oil and, in particular, rapeseed oil. Suitable rapeseed oils are both traditional types of high erucic acid content and also the more modern types of reduced erucic acid content and increased oleic acid content.

Methylesters corresponding to this definition can be particularly important simply because problems of vulnerability to oxidation which may possibly arise in practice are alleviated in their case.

However, carboxylic acid mixtures of the second sub-class mentioned above have also proved extremely valuable in the form of the methylester. They are readily available from natural fats of vegetable or animal origin. Classic examples of oils which have a high content of $C_{16-18}$ or $C_{16-22}$ carboxylic acids and which, at the same time, contain at least about 45% by weight of at least diethylenically unsaturated carboxylic acids are cottonseed oil, soybean oil, sunflower oil and linseed oil. The tall oil acids isolated during the recovery of cellulose also fall within this range. A typical example of an animal starting material for the production of corresponding carboxylic acid mixtures is fish oil, particularly herring oil.

However, another equally important embodiment of the invention is characterized by the use of methylesters of at least predominantly saturated monocarboxylic acids. Particular significance is attributed in this regard to carboxylic acids having relatively short C -chain lengths, i.e. in particular to monocarboxylic acids containing 6 to 16 carbon atoms, preferably 8 to 16 carbon atoms and more preferably about 9 to 15 carbon atoms. Carboxylic acids having C chain lengths within this range can be obtained both from renewable oils and fats of natural origin and by the various known processes for the industrial synthesis of such carboxylic acids.

Possible methods for the industrial synthesis of such fatty acids are described in detail, for example, in Ullmann, Enzyklopädie der technischen Chemie, Vol. 11, Chapter "Fettsäuren (Fatty Acids)", in particular the Table on page 543 (4th Edition).

Within this range of methylesters having comparatively short C chain lengths, particular importance is attributed to the carboxylic acids and carboxylic acid mixtures obtainable from natural sources, particularly vegetable oils and fats. One important embodiment is characterized by the use of methylesters of substantially saturated aliphatic monocarboxylic acids containing from 12 to 16 and more especially 12 to 14 carbon atoms. The use of esters of other aliphatic monocarboxylic acids, particularly those having shorter C chains, can be useful.

In this particular case also, the methylesters are derived from monocarboxylic acids having linear or branched hydrocarbon chains. Particular significance is attributed to the methylesters of corresponding linear acids. Carboxylic acids or carboxylic acid mixtures of vegetable origin predominantly containing saturated monocarboxylic acids of the range in question here may be obtained, for example, from renewable triglycerides, such as coconut oil, palm kernel oil or babassu oil. Fatty acid mixtures of this origin generally contain a limited quantity of lower fatty acids ($C_{6-10}$) of generally at most about 15%. Their tent of $C_{12-14}$ acids predominates by far, generally making up at least 50% and typically 60% or more of the carboxylic acid mixture. The small balance remaining is made up of higher fatty acids, particular significance being attributed in this range to unsaturated components.

By suitably choosing and mixing the carboxylic acid residues in the methylester mixture used, it is possible on the one hand to control and predetermine the rheological properties of the methylesters themselves in such a way that the high flowability and pumpability required are obtained, even at low temperatures of 0 to 5.C, without on the other hand an unwanted reduction in the flash points of the oil phase having to be accepted. In addition, however, it has been found that it is even possible by using the methylesters to control the rheological properties of those ester oils of higher alcohols which, as such, show unsatisfactory flowability and pumpability, particularly at temperatures in the low range mentioned. Methylesters of the type used in accordance with the invention can clearly serve as effective diluents for the continuous oil phase of the invert drilling muds. As already mentioned, however, not only are the rheological properties of the drilling mud improved, their stability to unwanted premature thickening during aging in use is also suppressed and their sensitivity to the addition of typical components as a corrosion-inhibiting alkali reserve is reduced.

Mixture Components in the Oil Phase

Oil components suitable for admixture with the monocarboxylic acid methylesters are the mineral oils typically used in drilling muds and, preferably, substantially nonaromatic aliphatic or cycloaliphatic hydrocarbon fractions having the required flow properties. Reference is made in this regard to the relevant prior-art literature and to the commercial products available on the market.

According to the invention, however, particularly important mixture components are environment-friendly ester oils of the type described in particular in the earlier applications cited above (U.S. Ser. No. 07/452,457 and 07/452,988). To complete the disclosure of the invention, essential characteristics of those esters and ester mixtures are briefly summarized in the following.

In a first embodiment, esters which are flowable and pumpable at 0° to 5° C. of monohydric $C_{2-12}$ and, more particularly, $C_{4-12}$ alcohols and aliphatic saturated $C_{12-16}$ monocarboxylic acids or mixtures thereof with at most substantially equal quantities of other monocarboxylic acids are used as the oil phase. Preferred ester oils are those of which at least about 60% by weight, based on the particular carboxylic acid mixture, are esters of aliphatic $C_{12-14}$ monocarboxylic acids and optionally, for the rest, small quantities of relatively short-chain aliphatic or relatively long-chain, in that case more especially mono-or polyolefinically unsaturated monocarboxylic acids. Preferred esters are those which have a Brookfield (RVT) viscosity at 0° to 5° C. of no more than 50 mPa.s, preferably of no more than 40 mPa.s and, more preferably, of at most 30 mPa.s. The esters used in the drilling mud have solidification values (pour point and setting point) below $-10°$ C. and preferably below $-15°$ C. and, in particular, flash points above 100° C. and preferably above 150° C. The carboxylic acids present in the ester or ester mixture are at least predominantly linear and, preferably, of vegetable origin. They may be derived from corresponding triglycerides, such as coconut oil, palm kernel oil or babassu oil. The alcohol radicals of the esters used are derived in particular from linear or branceed saturated alcohols preferably containing 4 to 10 C atoms. These alcohol components may also be of vegetable or animal origin, having been obtained by reductive hydrogenation of corresponding carboxylic acid esters.

The other class of particularly suitable ester oils is derived from mono- or polyolefinically unsaturated $C_{16-24}$ monocarboxylic acids or mixtures thereof with small quantities of other, in particular saturated monocarboxylic acids and monofunctional $C_{2-12}$ alcohols. These ester oils are also flowable and pumpable at temperatures in the range from 0° to 5° C. Particularly suitable esters of this type are those of which more than 70% by weight, preferably more than 80% by weight and, in particular, more than 90% by weight are derived from olefinically unsaturated $C_{16-24}$ carboxylic acids.

In their case, too, the solidification values (pour point and setting point) are below $-10°$ C. and preferably below $-15°$ C. while the flash points are above 100° C. and preferably above 160° C. The esters used in the drilling mud have a Brookfield (RVT) viscosity at 0° to 5° C. of n more than 55 mPa.s and preferably of no more than 45 mPa.s.

Ester oils of the type herein may be divided into two sub-classes. In the first sub-class, no more than 35% by weight of the unsaturated $C_{16-24}$ monocarboxylic acid residues in the ester are derived from di- and polyolefinically unsaturated acids, preferably at least about 60% by weight of the acid residues being monoolefinically unsaturated. In the second sub-class, more than 45% by weight and preferably more than 55% by weight of the $C_{16-24}$ monocarboxylic acids in the ester mixture are derived from di- or polyolefinically unsaturated acids. Saturated $C_{16-18}$ carboxylic acids in the ester mixture best make up no more than about 20% by weight and, in particular, no more than about 10% by weight. However, saturated carboxylic acids preferably have relatively low carbon chain lengths of the acid residues. In this case, too, the carboxylic acid residues present are at least predominantly linear and are of preferably vegetable or animal origin. Vegetable starting materials are, for example, palm oil, peanut oil, castor oil and, in particular, rapeseed oil. Carboxylic acids of animal origin are, in particular, corresponding mixtures of fish oils, such as herring oil.

In another important embodiment of the invention, however, the esters of corresponding monocarboxylic acids with polyfunctional alcohols, particularly lower polyfunctional alcohols containing 2 or 3 hydroxyl groups, are also suitable as ester-based mixture components. The most important representatives of this class are the reaction products of the monocarboxylic acids mentioned with glycerol, more especially the triglycerides. Among natural oils and fats, materials such as these are abundantly available at an acceptable price, the following natural products being mentioned by way of example: coconut oil, palm kernel oil, palm oil, soybean oil, peanut oil, rapeseed oil, olive oil, linseed oil, sunflower oil or castor oil.

As already mentioned, the idea of using esters of this type in drilling muds has already been discussed in the literature. However, on account of the totally inadequate rheological properties of these glycerol esters, invert drilling muds based on these starting materials which would be suitable for use in practice have not hitherto been known. The invention opens up the possibility of making glycerol esters of this type for the first time a substantial constituent of drilling muds of high ecological compatibility. The fatty acid methylesters of the type described in accordance with the invention are also highly effective diluents and stabilizers for such glycerol esters and not only for materials of natural origin, but also for synthetic glycerol esters.

In combination with the ester oils of polyfunctional alcohols, particularly glycerides of the described type, it can be useful to use those ester oils based on the methylesters which are distinguished by high structural mobility and flowability, even at low temperatures. Methylester cuts of comparatively low monocarboxylic acids, particularly saturated monocarboxylic acids, for example methylesters of $C_{8-12}$ and, in particular, $C_{8-10}$ carboxylic acids, are particularly suitable. However, ester oil mixtures in the context of the invention are not solely confined to representatives such as these. The methylesters of higher carboxylic acids are also valuable mixture components for liquefying the triglycerides; in their case, the proportion of ester oil based on methylester may have to be somewhat higher than in the case of the lower methylesters mentioned above to obtain satisfactory rheological data, even at low temperatures.

The invention also encompasses multicomponent mixtures which, together with the ester oils based on the methylesters according to the invention, may contain several of the mixture components listed in detail in the foregoing. Basically, it is possible in this regard to use any mixtures providing they satisfy the basic rheological requirements for invert drilling muds of the type herein. Examples of such multicomponent mixtures are materials based on various types of ester oils or mixtures additionally containing mineral oil.

The Mixing Ratios in the Oil Phase

It has surprisingly been found that even comparatively small quantities of methylester oil of the type used in accordance with the invention lead on the one hand to a substantial improvement in the rheological properties of the drilling mud and, on the other hand, to an improvement in aging resistance and a reduction in sensitivity to the addition of alkali to the drilling mud. For example, ready-to-use drilling muds may be obtained using predominant quantities of ester oils based on natural or synthetic triglycerides providing the ester oil mixtures used contain from about 15 to 50% by weight and, in particular, from about 15 to 30% by weight methylester. The resistance to aging of the ester oils based on monofunctional alcohols containing at least 2 carbon atoms and their resistance to the addition of alkali reserves are substantially improved by the us of comparatively limited quantities of methylester.

As already mentioned, however, the invention is not limited to the use of the methylester oils in such small quantities. The methylesters may make up the predominant part of the continuous oil phase or even the entire oil phase. In numerical terms, therefore, the methylester may form in particular about 10 to 100% by weight of the continuous oil phase providing the basic rheological requirements for the invert mud are satisfied.

Other Mixture Components of the Invert Drilling Mud

Other suitable mixture components of the invert drilling mud are any of the constituents typically used for the conditioning and for the practical application of invert drilling muds of the type used at present with mineral oils as the continuous oil phase. In addition to the disperse aqueous phase, emulsifiers, weighting agents, fluid loss additives, thickeners and alkali reserves are particularly important in this regard.

In one particularly important embodiment of the invention, use is also made here of the further development of such invert drilling muds based on ester oils which is the subject of Applicants' jointly-filed application U.S. Ser. No. 07/478,185 "Oleophilic basic amine compounds as an additive for invert drilling muds").

The teaching of this jointly-filed application is based on the concept of introducing into invert drilling muds based on ester oils an additional additive which is capable of keeping the desired rheological data of the drilling mud in the required range, even when increasingly larger quantities of free carboxylic acids are formed in use by partial ester hydrolysis. Not only are these carboxylic acids to be trapped in a harmless form, it is also intended to be possible to convert these free carboxylic acids if desired into valuable components having stabilizing or emulsifying properties for the system as a whole. According to the teaching of said application, basic amine compounds of pronounced oleophilic character and at most limited solubility in water, which are capable of forming salts with carboxylic acids, are to be used as an additive in the oil phase. The oleophilic amine 10 compounds may be simultaneously used at least partly as alkali reserve of the invert drilling mud, although they may also be used in combination with conventional alkali reserves, particularly lime. It is particularly preferred to use oleophilic amine compounds which are at least predominantly free from aromatic constituents. Optionally olefinically unsaturated aliphatic, cycloaliphatic or heterocyclic, oleophilic basic amine compounds containing one or even more N groups capable of forming salts with carboxylic acids are particularly suitable. In one preferred embodiment, these amine compounds have a solubility in water at room temperature of at most about 5% by weight and best below 1% by weight.

Typical examples of such amine compounds are at least substantially water-insoluble primary, secondary, or tertiary amines, which may even be alkoxylated to a limited degree or substituted by, in particular, hydroxyl groups. Other examples are corresponding aminoamides or heterocycles containing nitrogen as a constituent of the ring. Suitable amine compounds of the type in question are, for example, basic amine compounds containing at least one long-chain, preferably $C_{8-36}$ and more preferably $C_{10-24}$ hydrocarbon radical which may even be mono- or polyolefinically unsaturated. The oleophilic basic amine compounds may be added to the drilling mud in quantities of up to about 10 lb/bbl, preferably in quantities of up to about 5 lb/bbl and more preferably in quantities of from about 0.1 to 2 lb/bbl.

It has been found that the use of such oleophilic basic amine compounds can effectively prevent thickening of the drilling mud presumably attributable to a disturbance of the w/o invert system and to the formation of free carboxylic acids by ester hydrolysis. Although the use of methylester-based ester oils on their own or in combination in accordance with the teaching of the invention provides substantial assistance against unwanted thickening of the invert drilling muds, the combination with the teaching of the application cited above is nevertheless an important embodiment of the invention disclosed herein.

The following observations also apply:

Invert drilling muds of the type herein typically contain the finely disperse aqueous phase, together with the continuous oil phase, in quantities of from about 5 to 45% by weight and preferably in quantities of from about 5 to 25% by weight. The range from about 10 to 25% by weight of disperse aqueous phase can be particularly important.

The following rheological data apply to the rheology of preferred invert drilling muds according to the invention: plastic viscosity (PV) in the range from about 10 to 60 mPa.s and preferably in the range from about 15 to 40 mPa.s, yield point (YP) in the range from about 5 to 40 lb/100 ft$^2$ and preferably in the range from about 10 to 25 lb/100 ft$^2$, as measured at 50° C. Full information on the determination of these parameters, on the measurement techniques used and on the otherwise standard composition of the invert drilling muds described herein can be found in the prior art cited above and, for example, in "Manual of Drilling Fluids Technology" published by NL-Baroid, London, GB, cf. in particular the Chapter entitled "Mud Testing—Tools and Techniques" and "Oil Mud Technology", which is freely available to interested experts. In the interests of fullness of disclosure, the following summary observations may be made:

Emulsifiers suitable for use in practice are systems which are capable of forming the required w/o emulsions. Selected oleophilic fatty acid salts, for example those based on amidoamine compounds, are particularly suitable, examples being described in the already cited U.S. Pat. No. 4,374,737 and the literature cited therein. One particularly suitable type of emulsifier is the product marketed by NL Baroid under the name of "EZ-mul".

Emulsifiers of the type herein are marketed in the form of concentrates and may be used, for example, in quantities of from about 2.5 to 5% by weight and more especially in quantities of from about 3 to 4% by weight, based in each case on the ester oil phase.

In practice, hydrophobicized lignite in particular is used as a fluid-loss additive and, hence, in particular for forming an impervious coating in the form of a substantially water-impermeable film over the walls of the well. Suitable quantities are, for example, in the range from about 15 to 20 lb/bbl or in the range from about 5 to 7% by weight, based on the ester oil phase.

In drilling muds of the type herein, the thickener normally used to create viscosity is a cationically modified, finely divided bentonite which may be used in particular in quantities of from about 8 to 10 lb/bbl or in the range from about 2 to 4% by weight, based on the ester oil phase. The weighting agent normally used in practice to establish the necessary pressure equalization is baryta which is added in quantities adapted to the particular conditions to be expected in the well. For example, it is possible by addition of baryta to increase the specific gravity of the drilling mud to values of up to about 2.5 and preferably in the range from about 1.3 to 1.6.

In invert drilling muds of the type herein, the disperse aqueous phase is charged with soluble salts, generally calcium chloride or potassium chloride, the aqueous phase preferably being saturated with the soluble salt at room temperature.

The emulsifiers or emulsifier systems mentioned above may also be used to improve the oil wettability of the inorganic weighting materials. In addition to the aminoamides already mentioned, alkyl benzenesulfonates and imidazoline compounds are mentioned as further examples. Additional information on the relevant prior art can be found in the following literature references: GB 2,158,437, EP 229 912 and German 32 47 123.

In addition to the advantages already mentioned, the drilling fluids based in accordance with the invention on the co-use of ester oils of the described type are also distinguished by distinctly improved lubricity. This is particularly important when the path of the drill pipe and hence the well deviate from the vertical during drilling, for example at considerable depths. In such cases, the rotating drill pipe readily comes into contact with the well wall and embeds itself therein. Ester oils of the type used as oil phase in accordance with the invention have a distinctly better lubricating effect than the mineral oils hitherto used, which is an important advantage of the teaching according to the invention.

EXAMPLES

In the following Examples, invert drilling muds were conventionally produced using the following starting formulation:

| | | |
|---|---|---|
| 230 ml | ester oil | |
| 26 ml | water | |
| 6 g | organophilic bentonite (Geltone ® II, a product of NL Baroid) | |
| 6 g | organophilic lignite (Duratone ®, a product of NL Baroid) | |
| 2 g | lime | |
| 6 g | w/o emulsifier (EZ-mul ® NT, a product of NL Baroid) | |
| 346 g | baryta | |
| 9.2 g | $CaCl_2.2H_2O$ | |

In this formulation, approximately 1.35 g lime correspond to the value of 2 lb/bbl.

After a w/o invert drilling mud was made up in known manner from the particular components used with variation of the ester oil phase, the viscosity values of the material were determined as follows first before and then after aging:

Measurement of viscosity at 50° C. in an NL Baroid Fann-35 viscosimeter. Plastic viscosity (PV), yield point (YP) and gel strength (lb/100 ft[1]) after 10 secs. and 10 mins. were determined in known manner.

The material was aged by treatment in an autoclave (so-called roller oven) for 48 hours (Examples 1 to 3) and for 24 hours (Examples 4, 5 and Comparison Example) at 125° C.

EXAMPLE 1

A rapeseed oil fatty acid methylester having the following characteristic data was used as the ester oil: acid value (max.) 1; saponification value 187 to 197; iodine value 100 to 115; chain distribution of the carboxylic acid residues: $C_{16}$, 5 to 10; $C_{18}$, 1 t 62; $C_{18''}$, 17 to 23; $C_{18'''}$, 7 to 12; $C_{20'}$, 1 to 4; remainder traces of various $C_{12-22}$ acids.

The characteristic data of the material determined before and after aging are shown in the following Table:

| | Unaged material | Aged material |
|---|---|---|
| Plastic viscosity (PV) | 21 | 25 |
| Yield point (YP) | 6 | 6 |
| Gel strength (lb/100 ft²) | | |
| 10 secs. | 6 | 7 |
| 10 mins. | 9 | 9 |

EXAMPLE 2

Soybean oil fatty acid methylester having the following characteristic data was used as the ester oil phase: acid value (max.) saponification value 189 to 195; iodine value 115 to 135; chain distribution of the carboxylic acid residues: $C_{16}$, 8 to 13; $C_{18}$, 3 t $C_{18''}$, 40 to 50; and $C_{18'''}$, 4 to 12; remainder traces of $C_{10}$- monocarboxylic acids.

The characteristic data of the material determined before and after aging are shown in the following Table:

|                         | Unaged material | Aged material |
|-------------------------|-----------------|---------------|
| Plastic viscosity (PV)  | 19              | 23            |
| Yield point (YP)        | 11              | 6             |
| Gel strength (lb/100 ft$^2$) |            |               |
| 10 secs.                | 7               | 6             |
| 10 mins.                | 7               | 7             |

EXAMPLE 3

Technical grade oleic acid methylester having the following characteristic data was used as the ester oil phase: acid value (max.) 1, saponification value 192 to 197; iodine value 84 to 92; chain distribution of the carboxylic acid residues: $C_{14}$, 2 to 5; $C_{16}$, 4 to 6; $C_{16'}$, 4 to 6; $C_{17}$ to 3; $C_{18}$, 1 to 3; $C_{18'}$, 63 to 73; $C_{18''}$, 7 to 12; remainder traces of various carboxylic acids up to $C_{22}$.

The characteristic data of the material determined before and after aging are shown in the following Table:

|                         | Unaged material | Aged material |
|-------------------------|-----------------|---------------|
| Plastic viscosity (PV)  | 21              | 23            |
| Yield point (YP)        | 6               | 6             |
| Gel strength (lb/100 ft$^2$) |            |               |
| 10 secs.                | 5               | 7             |
| 10 mins.                | 7               | 9             |

In Examples 4 and 5 below, mixtures of a head-fractionated fatty acid methylester (chain length of the saturated carboxylic acid residues $C_{6-12}$) with an undistilled isobutyl rapeseed oil ester were used as the continuous oil phase. The isobutyl rapeseed oil ester is based on a mixture of predominantly unsaturated linear carboxylic acids substantially corresponding to the following distribution: 60% oleic acid, 20% linoleic acid, 9 to 10% linolenic acid, olefinically unsaturated $C_{20-22}$ monocarboxylic acids approx. 4%, remainder saturated, predominantly $C_{16-18}$ monocarboxylic acids.

The rapeseed oil ester used has the following characteristic data: density (20° C.) 0.872 g/cm$^3$; pour point below −15° C.; flash point (DIN 51584) above 180° C.; acid value (DGF-CV2) 1.2; viscosity at 0° C. is 32 mPa.s, viscosity at 5° C. is 24 mPa.s; no aromatics.

The characteristic data of the head-fractionated fatty acid methyl ester are as follows: saponification value 320 to 325, iodine value max. 1, pour point −28° C., chain length distribution $C_6$, 3 to 8; $C_8$, 50 to 60; $C_{10}$, 30 to 40; $C_{12}$, 1 to 5.

Blends of 20% by weight of the head-fractionated fatty acid methylester with 80% by weight of the isobutyl rapeseed oil ester were used in Examples 4 and 5. In Example 4, only 1 g lime was used as alkali reserve in the starting formulation shown above. For comparison, in Example 5, 2 g lime was used as alkali reserve.

The characteristic data of the material are as follows:

EXAMPLE 4

|                         | Unaged material | Aged material |
|-------------------------|-----------------|---------------|
| Plastic viscosity (PV)  | 21              | 23            |
| Yield point (YP)        | 8               | 6             |

-continued

|                         | Unaged material | Aged material |
|-------------------------|-----------------|---------------|
| Gel strength (lb/100 ft$^2$) |            |               |
| 10 secs.                | 6               | 5             |
| 10 mins.                | 8               | 7             |

EXAMPLE 5

|                         | Unaged material | Aged material |
|-------------------------|-----------------|---------------|
| Plastic viscosity (PV)  | 24              | 24            |
| Yield point (YP)        | 9               | 6             |
| Gel strength (lb/100 ft$^2$) |            |               |
| 10 secs.                | 8               | 5             |
| 10 mins.                | 11              | 7             |

In Examples 4 and 5, aging was carried out over a period of 24 hours at 125° C.

Comparison Example

For comparison, the isobutyl rapeseed oil ester was used as oil phase with addition of 1 g lime to the starting formulation shown above. The rheological data was determined before and after aging of the material (24 hours at 125° C.). The quantity of lime used in this formulation is below the threshold of 2 lb/bbl according to the earlier cited application (U.S. Ser. No. 07/452,457).

The characteristic data are as follows:

|                         | Unaged material | Aged material |
|-------------------------|-----------------|---------------|
| Plastic viscosity (PV)  | 27              | 28            |
| Yield point (YP)        | 10              | 18            |
| Gel strength (lb/100 ft$^2$) |            |               |
| 10 secs.                | 6               | 7             |
| 10 mins.                | 8               | 8             |

We claim:

1. A process for improving the flowability of a water-in-oil invert drilling mud and reducing its sensitivity to alkali reserve, while protecting said mud against unwanted thickening during use, consisting essentially of adding to said mud from about 10 to about 100 percent by weight, based on the weight of the continuous oil phase, of a methylester of a $C_6$-$C_{24}$ monocarboxylic acid, said methylester having a Brookfield viscosity of less than about 50 mPas and being liquid and pumpable at a temperature of about 0° to about 5° C., said mud containing said methylester in a continuous oil phase together with a disperse aqueous phase, an emulsifier, weighting agent and fluid loss additive.

2. A process as in claim 1 wherein said methylester has a solidification point of less than about 0° C. and a flash point of more than about 70° C.

3. A process as in claim 1 wherein said oil phase also contains a low-toxicity hdyrocarbon drilling oil, a carboxylic acid ester oil of another monofunctional alcohol, or an ester of a monocarboxylic acid and a polyfunctional alcohol.

4. A process as in claim 1 wherein said methylester is derived from a $C_8$-$C_{24}$ monocarboxylic acid, the monocarboxylic acids containing at least 16 carbon atoms are partly olefinically unsaturated, and the lower carbon chain length monocarboxylic acid comprise saturated carboxylic acids.

5. A process as in claim 1 wherein at least about 70% by weight of said methylester is derived from an olefinically unsaturated $C_{16}$-$C_{24}$ carboxylic acid.

6. A process as in claim 1 wherein said methylester is derived from unsaturated $C_{16}$-$C_{24}$ monocarboxylic acids and less than about 35% by weight thereof are diolefinically or polyolefinically unsaturated.

7. A process as in claim 1 wherein said methylester contains less than about 20% by weight of saturated $C_{18}$-$C_{18}$ a carboxylic acids in said oil phase.

8. A process as in claim 1 wherein said oil phase includes an ester oil derived from a mono- or polyolefinically unsaturated $C_{16}$-$C_{24}$ monocarboxylic acid and saturated monocarboxylic acids and monofunctional $C_2$-$C_{12}$ alcohols having a solidification point of less than about $-10°$ C. and a flash point of more than about 100° C.

9. A process as in claim 1 wherein said oil phase includes an ester of a monofunctional $C_2$-$C_{12}$ alcohol and an aliphatic, saturated $C_{12}$-$C_{16}$ monocarboxylic acid.

10. A process as in claim 1 wherein said methylester is derived from a vegetable, animal, or synthetic carboxylic acid.

11. A process as in claim 1 wherein said alkali reserve comprises lime.

12. A process as in claim 1 wherein said oil phase also contains an amine compound having an oleophilic character and a limited solubility in water which is capable of forming a salt with a free carboxylic acid.

13. A process as in claim 1 wherein said oil phase and said disperse aqueous phase are present in an amount of from about 5 to about 45 percent by weight, based on the weight of said mud.

14. A water-in-oil invert drilling mud which is suitable for the development of oil and gas sources, said mud consisting essentially of from about 10 to about 100 percent by weight, based on the weight of the continuous oil phase, of a methylester of a $C_6$-$C_{24}$ monocarboxylic acid in a continuous oil phase together with a disperse aqueous phase, an emulsifier, weighting agent and fluid loss additive, said methylester having a Brookfield viscosity of less than about 50 mPas and being liquid and pumpable at a temperature of about 0 to about 5° C., said methylester providing improvement in the rheology of said drilling mud and reducing its sensitivity to alkali reserve while protecting said mud against unwanted thickening during use.

15. A drilling mud as in claim 14 wherein said oil phase also contains a low-toxicity hydrocarbon drilling oil, a carboxylic acid ester oil of another monofunctional alcohol, or an ester of a monocarboxylic acid and a polyfunctional alcohol.

16. A drilling mud as in claim 14 also containing an alkali reserve component selected from lime, zinc oxide, and a basic amine compound having an oleophilic character and a limited solubility in water which is capable of forming a salt with a free carboxylic acid.

17. A drilling mud as in claim 14 having a plastic viscosity of from about 10 to about 60 mPa.s and a yield point of from about 5 to about 40 lb/100 ft$^2$ at a temperature of about 50° C.

18. A drilling mud as in claim 14 wherein said oil phase and said disperse aqueous phase are present in an amount of from about 5 to about 45 percent by weight, based on the weight of said mud.

* * * * *

UNITED STATES PATENT AND TRADEMARK OFFICE
CERTIFICATE OF CORRECTION

PATENT NO. : 5,106,516

DATED : April 21, 1992

INVENTOR(S) : Mueller et al.

It is certified that error appears in the above-identified patent and that said Letters Patent is hereby corrected as shown below:

In claim 7, column 15, line 12, "C18-C18 a" should read --C16-C18--.

Signed and Sealed this

Twenty-fourth Day of August, 1993

Attest:

BRUCE LEHMAN

Attesting Officer      *Commissioner of Patents and Trademarks*